Aug. 17, 1926.
W. A. SONNETT
VALVE
Filed April 7, 1926
1,596,320
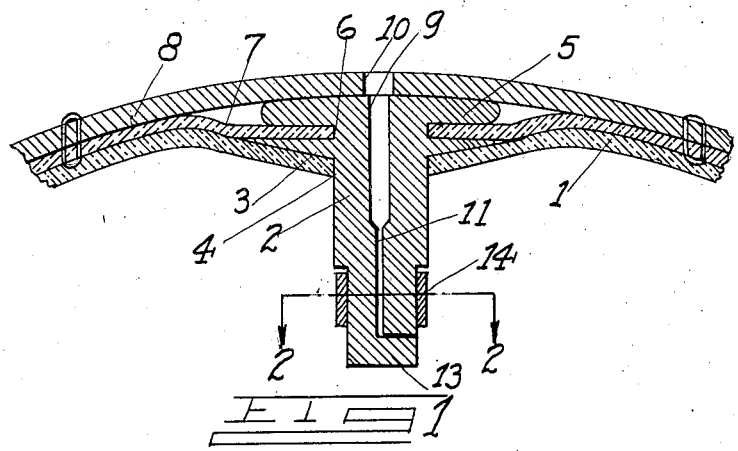
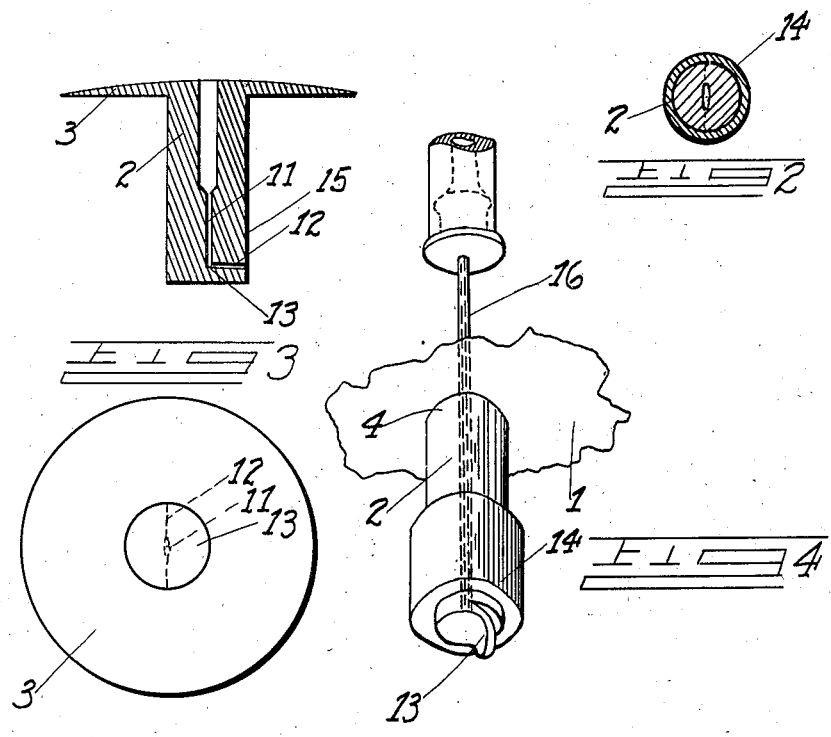
INVENTOR.
William A. Sonnett
BY
Allen & Allen
ATTORNEY.

Patented Aug. 17, 1926.

1,596,320

UNITED STATES PATENT OFFICE.

WILLIAM A. SONNETT, OF CINCINNATI, OHIO, ASSIGNOR TO P. GOLDSMITH SONS COMPANY, OF CINCINNATI, OHIO, A CORPORATION OF OHIO.

VALVE.

Application filed April 7, 1926. Serial No. 100,426.

My invention relates to valves generally and particularly to such valves as are adapted for use in combination with playing balls comprising an outer cover with a resilient inflatable bladder within the cover.

It is the object of my invention to provide a tubular rubber valve or its equivalent made from other resilient material, which shall have the combination of a double seal which will open during the inflation period, and which will resist back leakage subsequent to the inflation of the bladder.

There has been recently, an important development in all classes of playing balls, of the combination with an outer cover having a hole therein, and an inner bladder having a tubular valve secured within the cover so that the opening in the valve will register with the opening in the cover. For inflating such balls, all that is necessary is the insertion of the stem of a pump within the hole in the cover, and the inflation of the ball.

Theoretically, there are a number of different types of valves which will function mechanically, but since the entire usefulness of such structures depends on the resistance of the valve to back leakage, small refinements in valve structure which seem unimportant, spell the difference between a successful structure, and one which is useless. For example, a valve which will leak ten per cent of the air from the inner bladder during a week's time will be found to be useless, and a valve to be successful must withstand leakage for a much longer period.

There are a number of different types of valves which depend for their resistance to backward leakage on a slit which is so arranged within the tubular stem, that the resilience of the material of which the stem is made, holds the slit closed against back leakage. I have found that in order to insure against back leakage that two slits disposed at angles to each other and connected with each other with means of closing both slits so that they will resist back leakage effectively, solves the problem of permanence of inflation.

It is my object therefore specifically to provide a valve stem within the inner bladder, which shall have an air inflating passage leading into a slit which will resist back leakage, and to further connect this first mentioned slit with another slit, about which the parts are so arranged that the last mentioned slitted portion will also prevent back leakage.

Referring to the drawings in which I have illustrated several modifications embodying my invention:—

Figure 1 is an enlarged sectional view of a section of a playing ball bisecting the tubular valve, with the parts shown in slightly distorted position so as to clearly disclose the valve structure.

Figure 2 is a sectional view of the stem taken along the lines 2—2 in Figure 1.

Figure 3 is a sectional view of a modified type of tubular valve shown detached from the bladder.

Figure 3ª is an end view of Figure 3.

Figure 4 is an imaginary view from the inner side of an inflated ball showing the position of the parts during deflation of the bladder by means of a deflating tool.

Generally indicated at 1 is the resilient inner bladder which in the modification shown in Figure 1, has a tubular valve 2, having a flange 3 which secures the valve to the bladder in position within a hole 4 in the bladder through which hole the stem extends. The stem illustrated in Figure 1, has a projecting portion 5, formed as a button, which is buttoned through a hole 6 in an inner flap 7, of the ball which is stitched to the outer cover 8, so that the air passage 9 of the tubular stem will register with a hole 10 in the outer cover 8. The method illustrated in Figure 1 of aligning the air passage in the stem with the hole in the cover, is only a preferred method of accomplishing this alignment, there being other well known ways of aligning the valve with an inflating hole in either the cover, or the closing flap of a laced ball.

The valve shown in Figure 3, has only one flange 3 and no button flange, it being so manufactured so that it can be cemented both to the bladder and to the inner side of the cover, or to the inner side of a cover flap such as the flap 7 shown in Figure 1.

The tubular valve is constructed as follows: The air passage 9 extends partway inwardly in the tube where it connects with a slit 11, which extends longitudinally through the stem. A segmentary slit 12 is also provided close to the end of the tube so that a flap 13 is formed in the end of the tube which will be held tightly against the longitudinal slit and because of the greatly increased area of the flap, will effectively seal the longitudinal slit. In order to effectively seal the longitudinal slit by a resilient member which presses the side walls of the slit together, I preferably provide a resilient band 14, which tends to resist outward expansion of the walls of the slit. As much of the success of a valve depends on the quality of rubber used in its manufacture, it will be within the scope of my invention to provide such resilient walls that they will effectively resist outward expansion of the longitudinal slit. I may further reinforce the outer walls surrounding the slit by means of a reinforced wall such as that indicated at 15 in Figure 3. The inflation of the bladder is accomplished by inserting the stem of a pump within the hole 10, and injecting air into the air passage extended through the stem. For deflating the bladder a tool 16, such as that shown in Figure 4 may be used. The tool is formed as a hollow needle which is extended through the air passage and the longitudinal slit and bears against the flap 13 with sufficient force to cause the flap to bend outwardly as indicated so that the air from within the bladder may pass back through the hollow needle.

Having thus described my invention what I claim as new and desire to secure by Letters Patent is:—

1. A tubular valve comprising a stem having means extended therefrom for attachment to an inflatable member, said stem having an air passage extending partway therethrough, and said stem having a longitudinal slit connected with the air passage with said slit connected with a transverse slit provided in the stem close to the end of the stem, whereby a sealing flap is provided for the end of the longitudinal slit.

2. A tubular valve comprising a stem having means extended therefrom for attachment to an inflatable member, said stem having an air passage extended therethrough, comprising at least in part, a longitudinal slit with said slit connected with a transverse slit provided in the stem close to the end of the stem, whereby a sealing flap is provided for the end of the longitudinal slit.

3. A tubular valve comprising a stem having means extended therefrom for attachment to an inflatable member, said stem having an air passage extended therethrough, comprising at least in part, a longitudinal slit with said slit connected with a transverse slit provided in the stem close to the end of the stem, whereby a sealing flap is provided for the end of the longitudinal slit and an elastic constrictive band about said stem above the transverse slit.

WILLIAM A. SONNETT.